US008801072B2

(12) United States Patent
Sasage et al.

(10) Patent No.: US 8,801,072 B2
(45) Date of Patent: Aug. 12, 2014

(54) VEHICULAR FASTENING STRUCTURE

(75) Inventors: Kohtaro Sasage, Higashihiroshima (JP); Kei Mizuno, Higashihiroshima (JP)

(73) Assignees: Mazda Motor Corporation, Hiroshima (JP); Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/822,619

(22) PCT Filed: Oct. 12, 2011

(86) PCT No.: PCT/JP2011/005718
§ 371 (c)(1),
(2), (4) Date: Mar. 12, 2013

(87) PCT Pub. No.: WO2012/049844
PCT Pub. Date: Apr. 19, 2012

(65) Prior Publication Data
US 2013/0168989 A1 Jul. 4, 2013

(30) Foreign Application Priority Data

Oct. 14, 2010 (JP) .................................. 2010-231389

(51) Int. Cl.
*B62D 27/04* (2006.01)
(52) U.S. Cl.
USPC ......................................... 296/35.1; 296/204
(58) Field of Classification Search
USPC ............. 296/35.1, 35.3, 204, 187.08, 203.01, 296/203.03; 403/299; 248/635
See application file for complete search history.

(56) References Cited

U.S. PATENT DOCUMENTS

| 3,193,237 | A | * | 7/1965 | Adams ....................... 267/141.4 |
| 4,781,504 | A | * | 11/1988 | Yuta .............................. 411/512 |
| 4,921,203 | A | * | 5/1990 | Peterson et al. ............. 248/635 |
| 5,199,834 | A | * | 4/1993 | Seidl et al. ....................... 411/5 |
| 5,409,283 | A | * | 4/1995 | Ban ............................... 296/35.1 |
| 5,988,610 | A |   | 11/1999 | Hiraki et al. |

(Continued)

FOREIGN PATENT DOCUMENTS

| JP | 01-099777 U | 7/1989 |
| JP | 2001-239955 A | 9/2001 |
| JP | 2003-113889 A | 4/2003 |
| JP | 2008-094135 A | 4/2008 |

OTHER PUBLICATIONS

International Search Report; PCT/JP2011/005718; Dec. 27, 2011.

*Primary Examiner* — Glenn Dayoan
*Assistant Examiner* — Pinel Romain
(74) *Attorney, Agent, or Firm* — Studebaker & Brackett PC

(57) ABSTRACT

A vehicular fastening structure for fastening a cabin 4 and a chassis frame 6 of a vehicle includes: a mounting bracket 18 provided on one of the cabin 4 and the chassis frame 6; a fastened member 27 provided on the other thereof; a fastening member 26 attached fixedly to the fastened member 27; and a shock absorbing member 39 disposed between the mounting bracket 18 and the fastened member 27, wherein the fastened member 27 is provided with a fixed attachment portion to which the fastening member 26 is fixedly attached and a guiding portion for guiding the fastening member 26 to the fixed attachment portion, and a support portion 32L for supporting the fastening member 26 by coming into contact with the fastening member 26 when the vehicle crashes such that the fastening member 26 deforms in accordance with an impact load input into the chassis frame 6 is provided on a base end portion of the guiding portion.

4 Claims, 10 Drawing Sheets

(56) References Cited

U.S. PATENT DOCUMENTS

| | | |
|---|---|---|
| 6,361,096 B2 * | 3/2002 | Kim .............................. 296/35.1 |
| 6,502,883 B2 * | 1/2003 | Rice .............................. 296/35.1 |
| 2008/0084093 A1 | 4/2008 | Kishima et al. |

* cited by examiner

Fig. 7
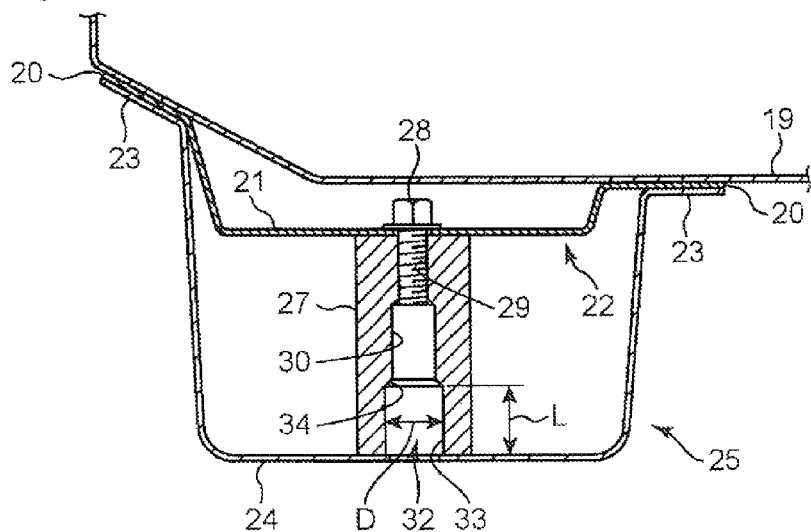
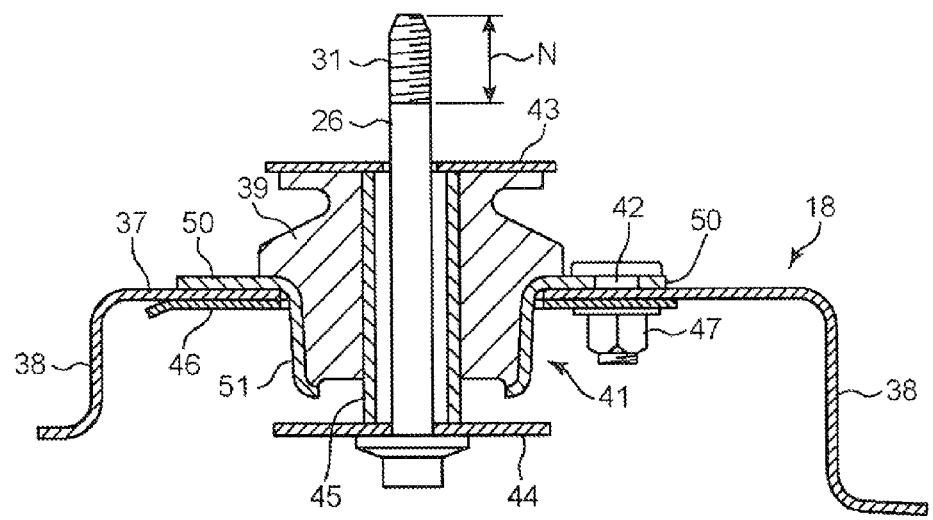

VEHICULAR FASTENING STRUCTURE

TECHNICAL FIELD

The present invention relates to a vehicular fastening structure for fastening a cabin and a chassis frame of a vehicle.

BACKGROUND ART

Conventionally, as illustrated in Patent Literature (PTL1), to increase the strength of a body relative to an external force input from a chassis frame and suppress vibration of a floor panel and muffled noise in a cabin by dispersing vibrational energy input from the chassis frame in a vehicular body mounting structure in which a floor cross member close to a pillar of the body is supported on the chassis frame via a body amount, one end portion of a mounting bolt provided in the body mount is fixed to a position of the floor cross member directly below the pillar.

CITATION LIST

Patent Literature

[PTL 1]
JP 2001-239955A

SUMMARY OF INVENTION

Technical Problem

In the vehicular body mounting structure disclosed in PTL1, an operation for fastening the cabin to the chassis frame can be performed easily without forming an opening portion for the operation in the floor panel of the cabin by fastening and joining the mounting bolt to a body mounting nut welded to the position of the floor cross member directly below the pillar from below the cabin (the body). However, when a head-on collision or the like occurs in the vehicle such that an impact load is input in a direction for causing the chassis frame to retreat, a large shearing force is exerted on the mounting bolt about a support portion constituted by the nut, and as a result, stress concentrates in a screw groove portion of the mounting bolt such that the mounting bolt breaks easily.

The present invention has been designed in consideration of the problem described above, and an object thereof is to provide a vehicular fastening structure with which a fastening strength between a cabin and a chassis frame of a vehicle can be improved effectively using a simple constitution.

Solution to Problem

To solve the problem described above, the present invention is a vehicular fastening structure for fastening a cabin and a chassis frame of a vehicle, including:

a mounting bracket provided on one of the cabin and the chassis frame;

a fastened member provided on the other thereof;

a fastening member provided on the mounting bracket side and fastened to the fastened member; and a shock absorbing member disposed between the mounting bracket and the fastened member, wherein the fastened member is provided with a fixed attachment portion to which the fastening member is fixedly attached and a guiding portion for guiding the fastening member to the fixed attachment portion, and a support portion for supporting the fastening member by coming into contact with the fastening member when the vehicle crashes such that the fastening member deforms in accordance with an impact load input into the chassis frame is provided on a base end portion of the guiding portion.

According to this constitution, the impact load input into the chassis frame can be dispersed and supported in a length direction of the fastening member, thereby effectively preventing the occurrence of a situation in which a shearing load corresponding to the impact load acts in a concentrated fashion on a specific part of the fastening member, causing the fastening member to break, and as a result, the fastening strength between the cabin and the chassis frame of the vehicle, which are fastened by the fastening member, can be maintained with stability.

BRIEF DESCRIPTION OF DRAWINGS

FIG. 7 is a view corresponding to FIG. 6 and showing a condition before a fastening member is fastened to a fastened member;

DESCRIPTION OF EMBODIMENTS

Figure 1:
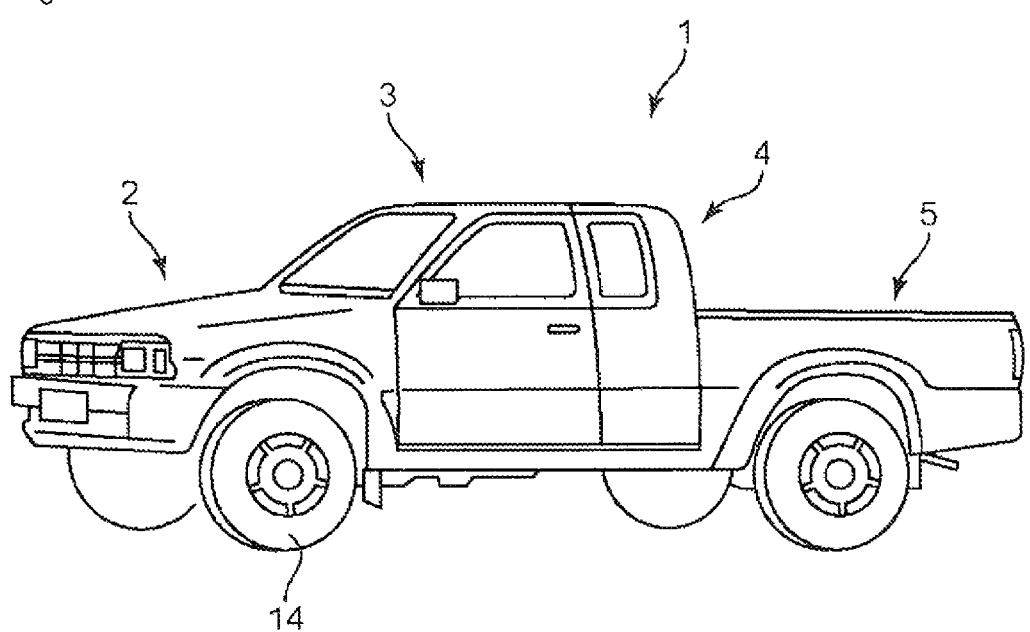
FIG. 1 is a perspective view showing an overall constitution of a vehicle including a fastening structure according to the present invention.
Figure 2:
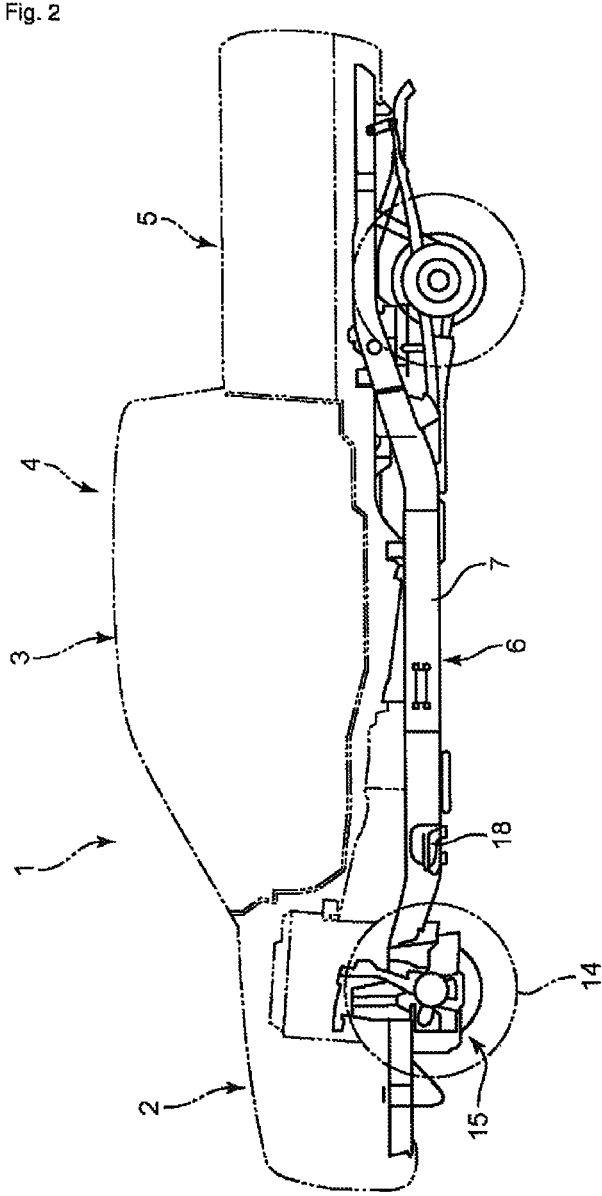
FIG. 2 is a side view showing a structure of a chassis frame of the vehicle.
Figure 3:
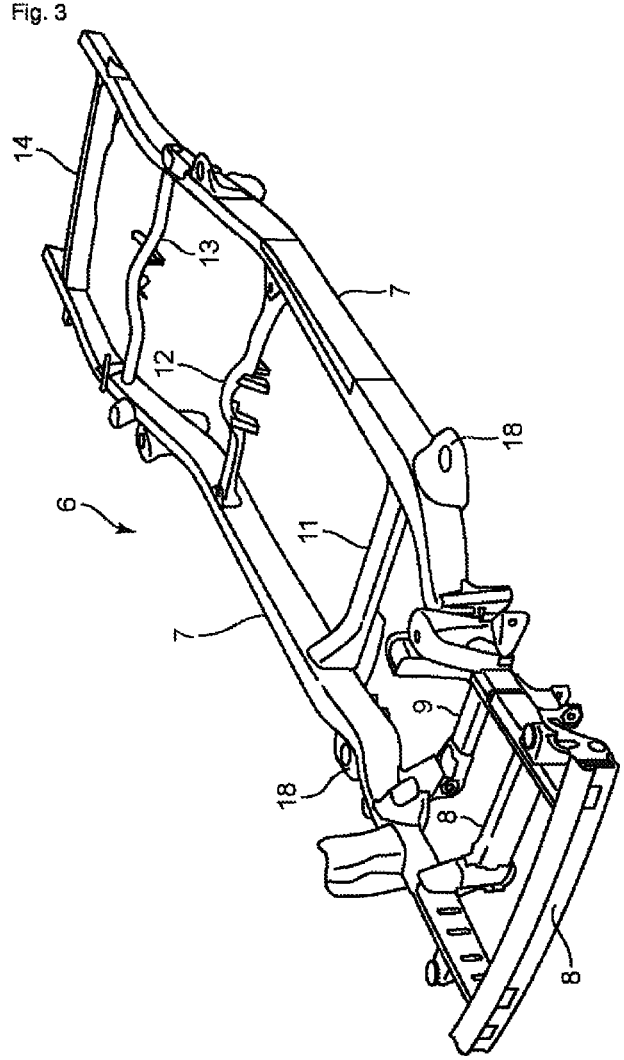
FIG. 3 is a perspective view showing the structure of the chassis frame of the vehicle.
Figure 4:
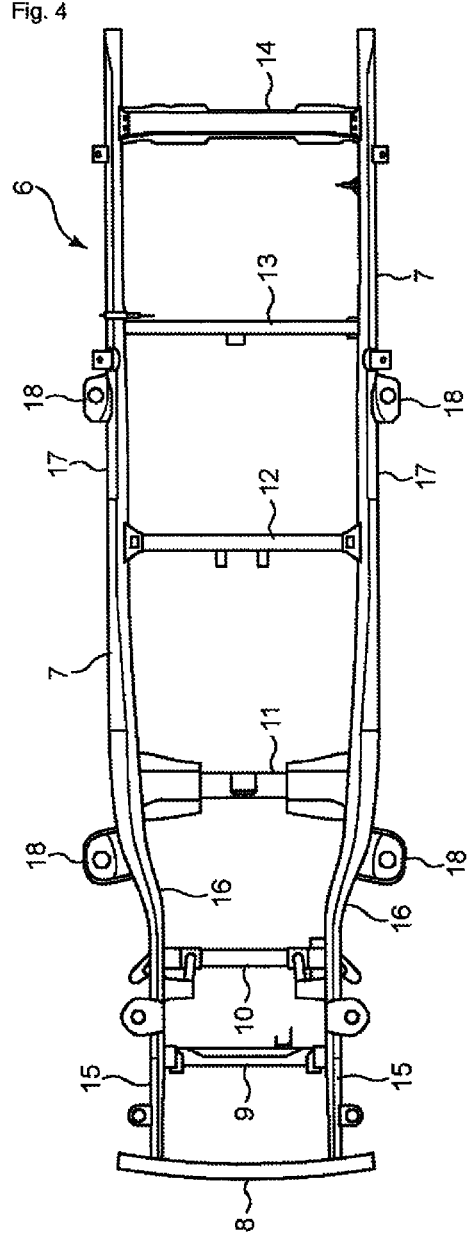
FIG. 4 is a plan view showing the structure of the chassis frame of the vehicle.

FIGS. 1 to 4 show the overall constitution of a vehicle 1 that is constituted by a small truck including a vehicular suspension support structure according to an embodiment of the present invention. The vehicle 1 includes a cabin 4 having an engine room 2 and a vehicle cabin 3, and a loading platform 5 disposed to the rear of the cabin 4, wherein the cabin 4 and the loading platform 5 are supported on a chassis frame 6. The chassis frame 6 is formed in a ladder shape when seen from above by a left-right pair of side frames 7, 7 extending in a front-rear direction of the vehicle 1 and a plurality of cross members 8 to 14 extending in a vehicle width direction so as to connect the left and right side frames 7, 7.

The side frame 7 of the chassis frame 6 includes a narrow portion 15 for supporting left and right side end portions of the engine room 2, a width increasing portion 16 that is connected to a rear end portion of the narrow portion 15 and increases in width toward a rear side, and a wide portion 17 connected to a rear end portion of the width increasing portion 16. Left and right side end portions of the cabin 4 and the load platform 5 are supported by the wide portion 17. Further, a mounting bracket 18 for supporting the cabin 4 is provided in a front-rear direction intermediate portion of the width increasing portion 16 relative to a boundary portion between the width increasing portion 16 and the wide portion 17 of the side frame 7.

Figure 5:
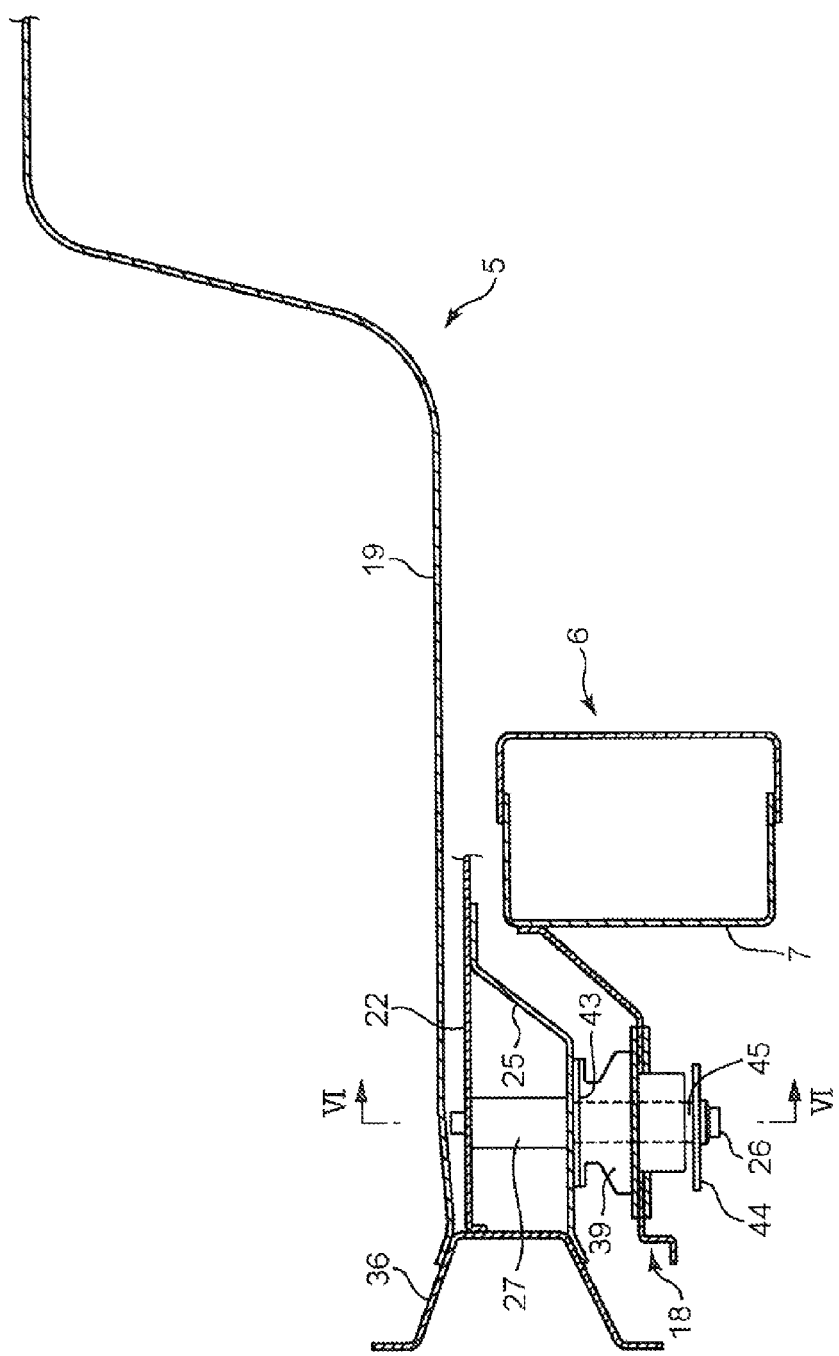
FIG. 5 is a front sectional view showing an embodiment of the fastening structure according to the present invention.
Figure 6:
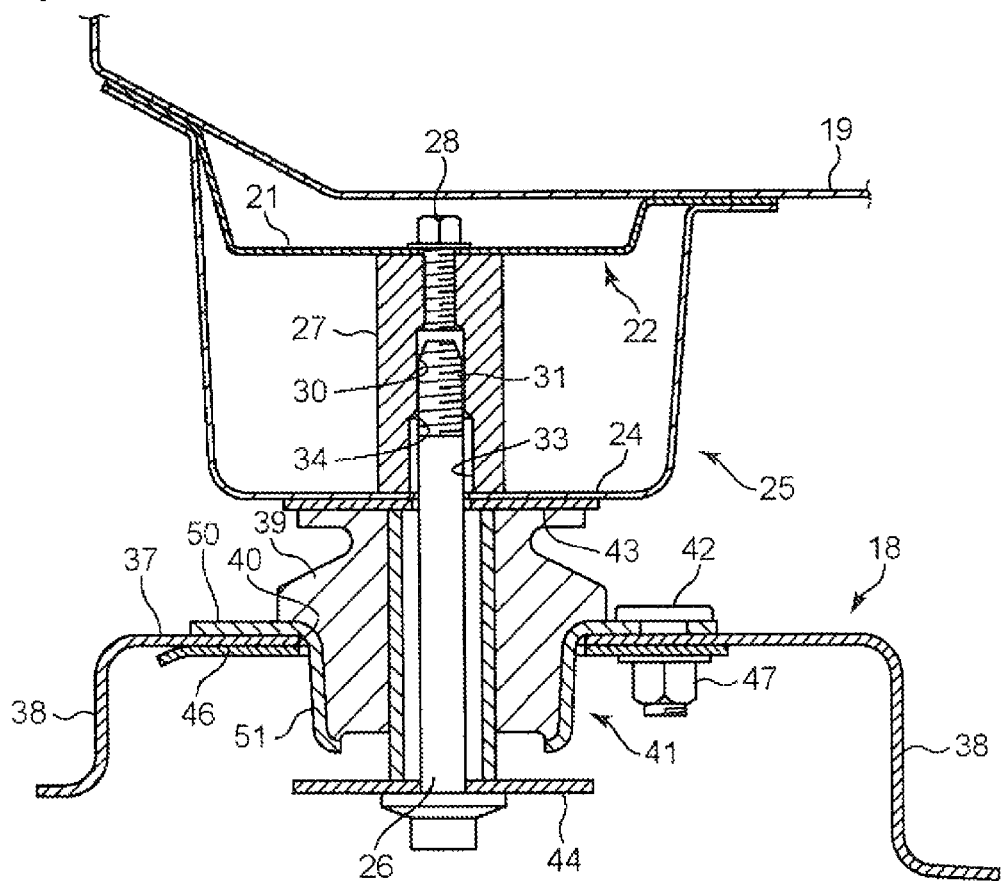
FIG. 6 is a sectional view taken along a VI-VI line in FIG. 5.

As shown in FIGS. 5 to 7, an upper plate 22 having a hat-shaped cross-section and including a flange portion 20 that is welded to a lower surface of a floor panel 19 constituting a floor surface portion of the cabin 4 and a bottom surface portion 21 disposed below the floor panel 19 at a predetermined distance therefrom is attached to the cabin 4. A lower plate 25 having a hat-shaped cross-section and including a flange portion 23 that is welded integrally to the lower surface of the floor panel 19 together with the flange portion 20 and a bottom surface portion 24 disposed below the floor surface portion 21 of the upper plate 22 at a predetermined distance therefrom is attached to the lower side of the upper plate 22.

A fastened member 27 to which a fastening member 26 for fastening the cabin 4 to the chassis frame 6 is attached fixedly is disposed between the bottom surface portion 21 of the upper plate 22 and the lower plate 25. An upper end portion of the fastened member 27 is fixed to the bottom surface portion 21 of the upper plate 22 by an attachment bolt 28. The fastened member 27 is constituted by a pole-shaped body having a circular cross-section. A screw hole 29 into which the aforesaid attachment bolt 28 is screwed and a fixed attachment portion 30 to which the aforesaid fastening member 26 is attached fixedly are formed respectively in an upper portion and a lower portion of the fastened member 27.

The fixed attachment portion 30 is constituted by an opening portion having an inner diameter that is slightly smaller than a diameter of a self-tapping screw portion 31 formed on a tip end portion of the fastening member 26. When the cabin 4 and the chassis frame 6 are fastened by the fastening member 26, the self-tapping screw portion 31 is screwed into the fixed attachment portion 30 of the fastened member 27 such that the tip end portion of the fastening member 26 is screwed into the fixed attachment portion 30 while forming a screw groove corresponding to the self-tapping screw portion 31 in a peripheral surface of the fixed attachment portion 30.

Figure 8:
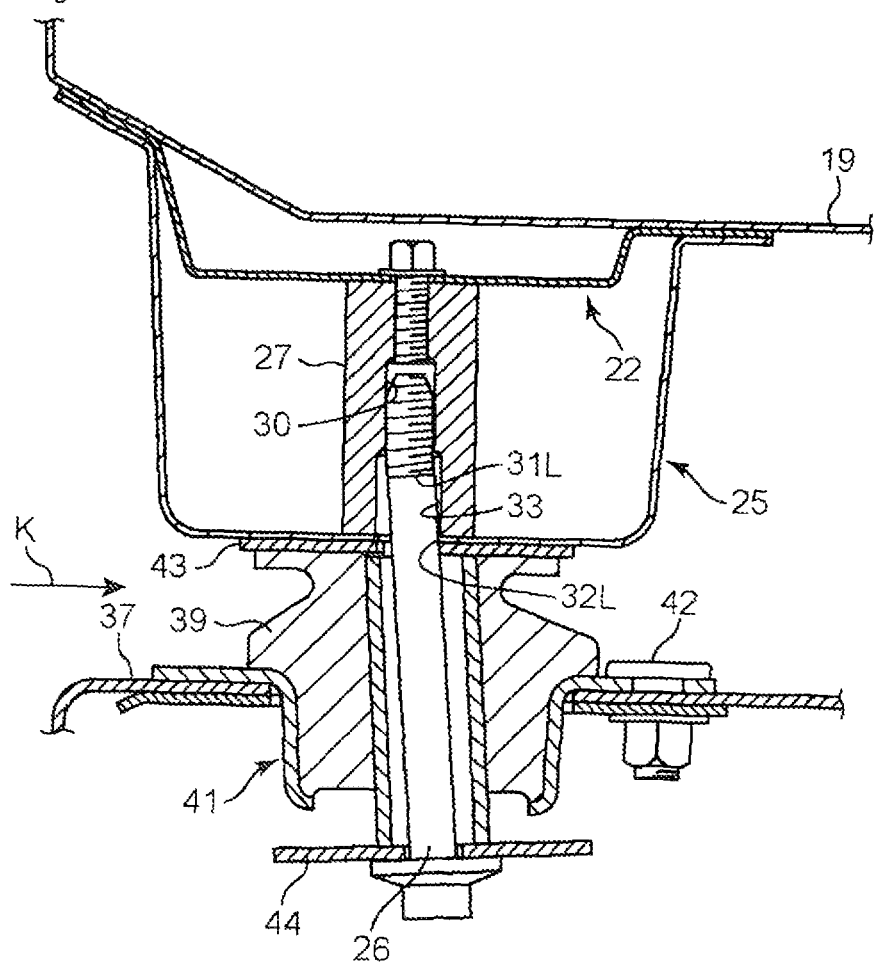
FIG. 8 is a view corresponding to FIG. 6 and showing a condition in which the fastening member has deformed.

Further, a guiding portion 32 for guiding the self-tapping screw portion 31 of the fastening member 26 into the fixed attachment portion 30 is formed in a lower end portion of the fastened member 27. The guiding portion 32 includes a through hole 33 having a larger diameter than a shaft diameter of the fastening member 26, or more specifically a diameter of the self-tapping screw portion 31, and a guide portion 34 that is provided on a tip end portion (or a depth end portion: an upper end portion as shown in FIGS. 6 & 7) of the through hole 33 and constituted by a tapered surface that tapers toward a tip end. An overall length L of the through hole 33 is set to have a larger value than a diameter D thereof so that when the vehicle 1 crashes, causing the fastening member 26 to deform in accordance with an impact load input into the chassis frame 6, a base end portion (an opening end portion: a lower end portion as shown in FIG. 8) of the through hole 33 forms a support portion 32L for supporting the deformed fastening member 26, as will be described below.

An opening portion for inserting the self-tapping screw portion 31 of the fastening member 26 is formed in the bottom surface portion 24 of the lower plate 25 in a position corresponding to the through hole 33. Further, an overall length N of the self-tapping screw portion 31 formed on the tip end portion of the fastening member 26 is set to be longer than an overall length of the fixed attachment portion 30 of the fastened member 27 by a predetermined distance so that when the self-tapping screw portion 31 is screwed to the fixed attachment portion 30, a lower end portion of the self-tapping screw portion 31 is positioned slightly below the fixed attachment portion 30.

The mounting bracket 18 includes an upper surface plate 37, a base end portion of which is welded to an outer surface of the chassis frame 6 and a tip end portion of which projects outwardly in the vehicle width direction, and a side surface plate 38 provided to surround a peripheral edge portion of the upper surface plate 37. A disposal hole 40 for a shock absorbing member 39 constituted by a rubber bush or the like is formed in the upper surface plate 37 of the mounting bracket 18, and a holding member 41 for holding the shock absorbing member 39 is fixed by an attachment bolt 42. In FIG. 5, a reference numeral 36 denotes a side sill provided on a side end portion of the cabin 4.

The mounting bracket 18 includes an upper-lower pair of washer plates 43, 44, a spacer 45 constituted by a pipe material disposed between the two washer plates 43, 44, an attachment plate 46 disposed below the upper surface plate 37, and a nut 47 disposed on a lower surface of the attachment plate 46. Further, a fixed plate 50 fixed to the upper surface plate 37 of the mounting bracket 18 via the attachment bolt 42 and an embracing portion 51 that embraces a lower portion of the shock absorbing member 39 are provided on the holding member 41.

In a condition where the shock absorbing member 39 is externally fitted and fixed to the spacer 45, the shock absorbing member 39 is embraced by the embracing portion 51 of the holding member 41, and the washer plates 43, 44 are disposed respectively above and below the spacer 45, the holding member 41 is inserted into the disposal hole 40 formed in the upper surface plate 37 of the mounting bracket 18 from above the disposal hole 40 and fixed to the upper surface plate 37 of the mounting bracket 18, and as a result, the shock absorbing member 39 is supported by the mounting bracket 18.

To fasten the cabin 4 of the vehicle 1 to the chassis frame 6 using the fastening member 26, the shock absorbing member 39, and so on, the attachment bolt 42 is screwed to the nut 47 in a condition where the upper surface plate 37 of the mounting bracket 18 is sandwiched from above and below by the fixed plate 50 and the attachment plate 46 of the holding member 41. As a result, the shock absorbing member 39 is fixed to the mounting bracket 18 via the holding member 41. Further, the self-tapping screw portion 31 of the fastening member 26, which is disposed to penetrate the lower portion washer plate 44, the spacer 45, and the upper portion washer plate 43 from below the mounting bracket 18, is inserted into the guiding portion 32 from below the fastened member 27 fixed to the chassis frame 6.

Next, the self-tapping screw portion 31 provided on the tip end portion of the fastening member 26 is introduced into the through hole 33 in the guiding portion 32, whereupon the tip end portion of the self-tapping screw portion 31 is guided via the guide portion 34 such that the self-tapping screw portion 31 is led into the fixed attachment portion 30 of the fastened member 27. The tip end portion of the fastening member 26 is then screwed to the fastened member 27 by screwing the self-tapping screw portion 31 into the fixed attachment portion 30 of the fastened member 27 while driving the fastening member 26 to rotate using a rotary tool, not shown in the drawings, and as a result, the upper portion washer plate 43 of the mounting bracket 18 is pressed into contact with the bottom surface portion 24 of the lower plate 25. Thus, the mounting bracket 18 is fixed to the cabin 4.

The mounting bracket 18 provided on the side frame 7 of the chassis frame 6 in this manner is fixed to the lower plate 25, which is attached to a side surface portion lower surface of the cabin 4. Hence, the cabin 4 and the chassis frame 6 of the vehicle 1 can be fastened via the mounting bracket 18, the fastening member 26, and so on in a condition where the shock absorbing member 39 is disposed between the cabin 4 and the chassis frame 6.

When a front end portion of the vehicle 1 having the above constitution collides with an obstruction or the like such that an impact load is input in a direction for causing the chassis frame 6 to retreat, the shock absorbing member 39 and the spacer 45 are urged backward via the mounting bracket 18. Accordingly, as shown in FIG. 8, a lower portion of the fastening member 26 is pushed backward while an upper portion of the fastening member 26 is held by the fastened member 27. As a result, the fastening member 26 is elastically deformed so as to tilt, thereby coming into contact with and being supported by the lower end portion (a support portion) 32L of the guiding portion 32 provided in the fastened member 27.

In the vehicular fastening structure formed such that the cabin 4 and the chassis frame 6 of the vehicle 1 are fastened by the fastening member 26 in a condition where the shock absorbing member 39 is disposed between the mounting bracket 18 provided on the chassis frame 6 and the fastened member 27 provided on the cabin 4, as described above, the fixed attachment portion 30 to which the fastening member 26 is fixedly attached and the guiding portion 32 for guiding the fastening member 26 to the fixed attachment portion 30 are provided in the fastened member 27, and the support portion 32L that supports the fastening member 26 by coming into contact with the fastening member 26 when the vehicle 1 crashes such that the fastening member 26 deforms in accordance with the impact load input into the chassis frame 6 is provided on the end portion of the guiding portion 32. Hence, a fastening strength between the cabin 4 and the chassis frame 6 of the vehicle 1 can be improved effectively using a simple constitution.

More specifically, when the vehicle 1 crashes with a structure such as the conventional structure shown in FIG. 9, for example, in which the guiding portion 32 is not provided and a female screw 63 into which a male screw 62 of a fastening member 64 is screwed is provided over substantially an entire lower portion region of a fastened member 61 provided below the floor panel 19, a large shearing force and a large bending load act in a concentrated fashion on a lower end portion vicinity 62a of the male screw portion 62 screwed into the female screw portion 63 of the fastened member 61 in accordance with an impact load K acting in a direction for causing the chassis frame 6 to retreat, and as a result, the fastening member 64 is more likely to break about a screw groove portion formed in the lower end portion vicinity of the male screw portion 62.

When the vehicle 1, during a head-on collision, in an embodiment of the present invention shown in FIGS. 6 and 7, in which the guiding portion 32 including the through hole 33 having a larger diameter than the shaft diameter of the fastening member 26 and the guide portion 34 provided on the tip end portion of the through hole 33 so as to taper toward a tip end is provided in the fastened member 27 and the overall length L of the through hole 33 is set at a larger value than the diameter D thereof, on the other hand, the lower portion of the fastening member 26 is pushed backward in accordance with the impact load K acting on the shock absorbing member 39 and the spacer 45 via the mounting bracket 18 in a direction for causing the chassis frame 6 to retreat, and as a result, the fastening member 26 elastically deforms into a tilted condition, as shown in FIG. 8. In this case, the lower portion of the fastening member 26 comes into contact with the lower end portion 32L of the guiding portion 32 provided in the fastened member 27 such that the fastening member 26 is supported thereby.

Hence, the impact load can be dispersed and supported in a length direction of the fastening member 26, thereby effectively preventing the occurrence of a situation in which a shearing load corresponding to the impact load acts in a concentrated fashion on a specific part of the fastening member 26, causing the fastening member 26 to break, and as a result, the fastening strength between the cabin 4 and the chassis frame 6 of the vehicle 1, which are fastened by the fastening member 26, can be maintained with stability. Moreover, the self-tapping screw portion 31 formed on the tip end of the fastening member 26 can be attached fixedly to the fixed attachment portion 30 of the fastened member 27 in a condition where the support portion 32L constituted by the lower end portion of the guiding portion 32 is removed from a lower end portion 31L of the self-tapping screw portion 31 of the fastening member 26, and therefore a situation in which the fastening member 26 breaks about a screw groove portion of the self-tapping screw portion 31 can be prevented effectively.

Figure 9:
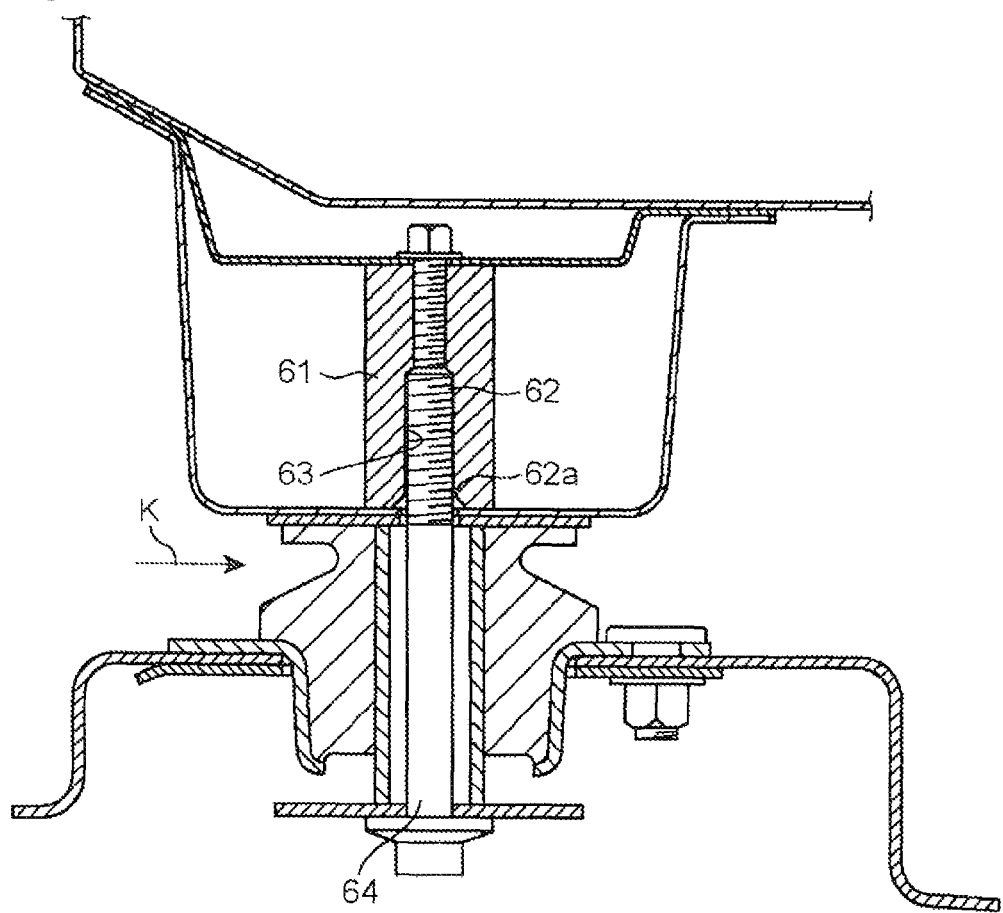
FIG. 9 is a view corresponding to FIG. 6 and showing a fastening structure according to a conventional example.
Figure 10:
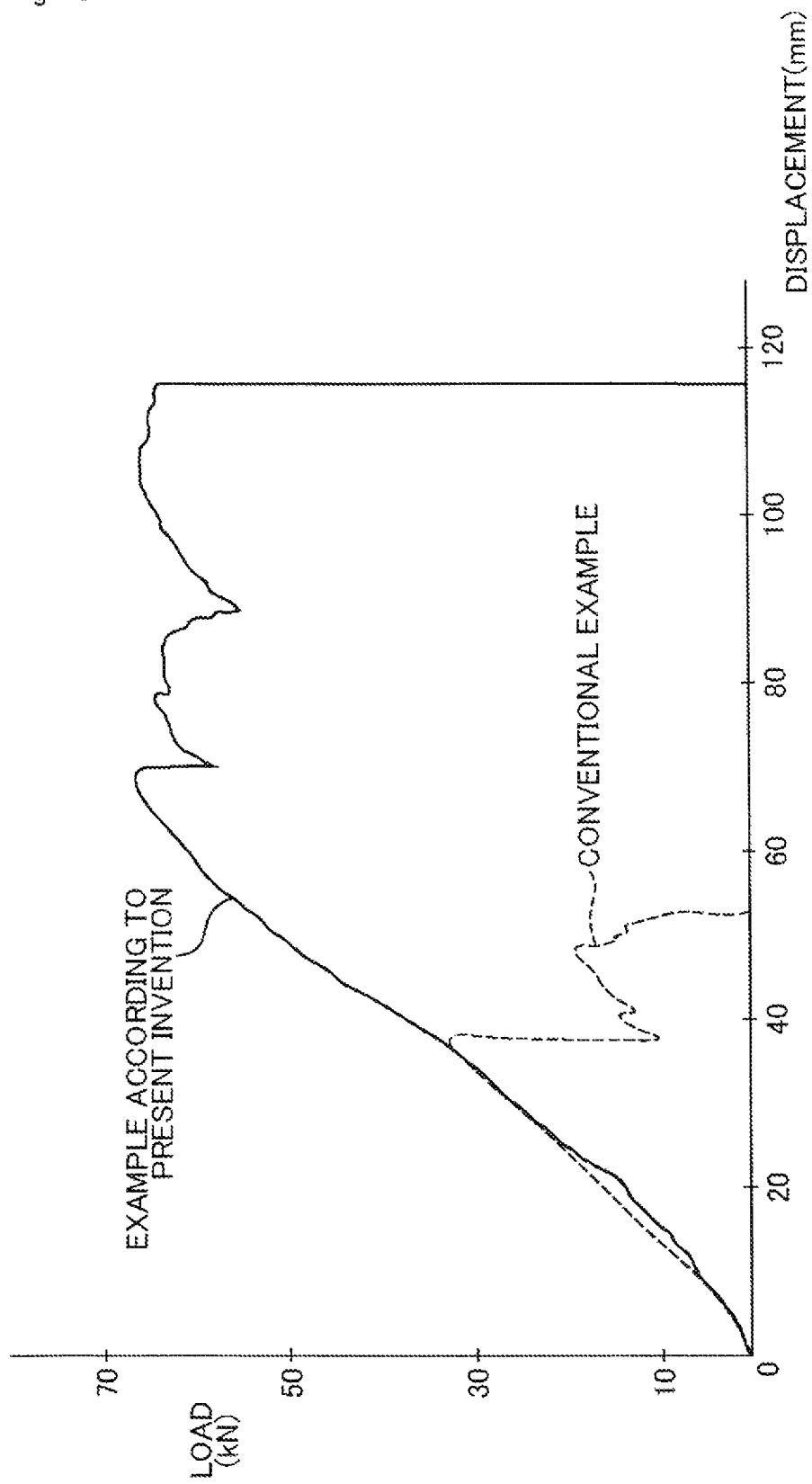
FIG. 10 is a graph showing a displacement condition of a fastening portion corresponding to a load acting on the fastening portion.

For example, when a test was performed to measure an amount of displacement in a fastening portion employing the fastening member 64, constituted by a fastening bolt having a diameter of 13 mm, in the conventional example shown in FIG. 9 while gradually increasing a load acting on the fastening portion, and to measure an amount of displacement in a fastening portion employing the fastening member 26, constituted by a self-tapping bolt having a diameter of 13 mm, in the example according to the present invention shown in FIGS. 6 and 7 while gradually increasing the load acting on the fastening portion, data shown in FIG. 10 were obtained. Note that in the example according to the present invention shown in FIGS. 6 and 7, the diameter D of the through hole 33 formed in the fastened member 27 was set at 18.0 mm, and the overall length L thereof was set at 23.2 mm.

It can be seen from the data shown in FIG. 10 that in the conventional example, the fastening member 64 reached a yield point when a load of 33.3 kN was exerted on the fastening portion constituted by the fastening member 64 such that the amount of displacement in the fastening portion reached approximately 35 mm, and when the amount of displacement reached approximately 55 mm, the fastening member 64 broke. In the example according to the present invention, on the other hand, the fastening member 26 reached the yield point when a load of 66.3 kN was exerted on the fastening portion constituted by the fastening member 26 such that the amount of displacement in the fastening portion reached approximately 70 mm, and the fastening member 26 did not break even when the displacement amount exceeded approximately 115 mm. It was thus confirmed that a dramatic improvement in the fastening strength between the cabin 4 and the chassis frame 6 of the vehicle 1 can be achieved in comparison with the conventional example.

Further, when the through hole 33 having a larger diameter than the shaft diameter of the fastening member 26 and the guide portion 34 provided on the tip end portion (upper end portion) of the through hole 33 so as to taper toward a tip end are provided, and the support portion (identical to the support portion 32L of the guiding portion 32) for the fastening member 26 is constituted by the base end portion (lower end portion) of the through hole 33, as described in the above embodiment, an insertion operation for inserting the tip end portion of the fastening member 26 into the fixed attachment portion 30 from below the guiding portion 32 can be performed easily without viewing an insertion position.

Moreover, when an impact load for causing the chassis frame 6 to retreat is input, the impact load is supported by the support portion (identical to the support portion 32L of the guiding portion 32) constituted by the lower end portion of the through hole 33, and therefore a situation in which the fastening member 26 breaks under the impact load can be prevented effectively. Further, the fastening strength between the cabin 4 and the chassis frame 6 of the vehicle 1, fastened by the fastening member 26, can be maintained with stability. Furthermore, the lower end portion of the self-tapping screw portion 31 formed on the fastening member 26 is positioned at a remove from the support portion constituted by the lower end portion of the through hole 33, and therefore breakage about the screw groove portion of the self-tapping screw portion 31 can be prevented effectively.

Note that appropriate values of the overall length L and diameter D of the through hole 33 necessary to ensure that the impact load for causing the chassis frame 6 to retreat is effectively supported by the support portion 32L constituted by the lower end portion of the through hole 33 when the impact load is input vary according to the diameter, material, and so on of the fastening member 26 and cannot therefore be prescribed uniformly. However, when the overall length L of the through hole 33 is smaller than the diameter D thereof, it is difficult to cause the lower portion of the fastening member 26 to contact the lower end portion of the guiding portion 32 so as to be supported thereby during a head-on collision in the vehicle 1, and therefore the overall length L of the through hole 33 is preferably set at least at a larger value than the diameter D thereof.

When an experiment was performed to measure the displacement condition of the fastening portion constituted by the fastening member 26 while varying the overall length L and diameter D of the through hole 33 in accordance with the shaft diameter of the fastening member 26, it was confirmed that by setting the overall length L of the through hole 33 at 1.5 to 2.0 times the diameter of the fastening member and setting the diameter D of the through hole 33 at 1.2 to 1.5 times the shaft diameter of the fastening member, it was possible, with a simple and compact constitution, to cause the lower portion of the fastening member 26 to contact the lower end portion of the guiding portion 32 so as to be supported thereby appropriately during a head-on collision or the like in the vehicle 1.

Furthermore, when the fastening member 26 is screwed into the fastened member 27 by screwing the self-tapping screw portion 31 formed on the tip end portion of the fastening member 26 into the fixed attachment portion 30 of the fastened member 27, as described in the above embodiment, a screw groove can be formed in the peripheral surface of the fixed attachment portion 30 of the fastened member 27 simultaneously with the fastening operation of the fastening member 26. Therefore, the fixed attachment operation of the fastening member 26 can be performed easily, and the cabin 4 and chassis frame 6 of the vehicle 1 can be fastened appropriately by the fastening member 26.

Further, in the example described in the above embodiment, the fastened member 27 is provided on the cabin 4 of the vehicle 1, the mounting bracket 18 is provided on the chassis frame 6, and the fastening member 26 is attached fixedly to the fastened member 27 from below the mounting bracket 18. However, vertical positions of the fastened member 27 and the mounting bracket 18 may be reversed. In other words, the mounting bracket 18 may be provided on the cabin 4 of the vehicle 1 and the fastened member 27 may be provided on the chassis frame 6 such that the fastening member 26 is attached fixedly to the fastened member 27 from above the mounting bracket 18.

Summary of the Present Invention

The present invention is a vehicular fastening structure for fastening a cabin (4) and a chassis frame (6) of a vehicle, including:

a mounting bracket (18) provided on one of the cabin (4) and the chassis frame (6);

a fastened member (27) provided on the other thereof;

a fastening member (26) provided on the mounting bracket (18) side and fastened to the fastened member (27); and a shock absorbing member (39) disposed between the mounting bracket (18) and the fastened member (27), wherein the fastened member (27) is provided with a fixed attachment portion (30) to which the fastening member (26) is fixedly attached and a guiding portion (32) for guiding the fastening member (26) to the fixed attachment portion (30), and a support portion (32L) for supporting the fastening member (26) by coming into contact with the fastening member (26) when the vehicle is in collision such that the fastening member (26) deforms in accordance with an impact load input into the chassis frame (6) is provided on a base end portion of the guiding portion (32).

According to the above constitution, the impact load input into the chassis frame (6) can be dispersed and supported in a length direction of the fastening member, thereby effectively preventing the occurrence of a situation in which a shearing load corresponding to the impact load acts in a concentrated fashion on a specific part of the fastening member, causing the fastening member to break, and as a result, the fastening strength between the cabin and the chassis frame of the vehicle, which are fastened by the fastening member, can be maintained with stability.

In the vehicular fastening structure described above, the guiding portion (32) comprises a through hole (33) having a larger diameter (D) than a shaft diameter of the fastening member (26) and a guide portion (34) provided on a tip end portion of the through hole (33) so as to taper toward a tip end, and the support portion (32L) is constituted by a base end portion of the through hole (33).

With this constitution, an insertion operation for inserting the tip end portion of the fastening member into the fixed attachment portion from an end portion of the guiding portion can be performed easily without viewing the insertion position. Moreover, by positioning an end portion of a screw groove formed on the fastening member at a remove from the support portion constituted by the end portion of the through hole, breakage of the fastening member about the screw groove portion can be prevented effectively.

In the vehicular fastening structure described above, an overall length (L) of the through hole (33) is set at a larger value than a diameter (D) thereof.

With this constitution, a lower portion of the fastening member can be caused to contact the lower end portion of the guiding portion reliably when the fastening member deforms elastically during a head-on collision or the like in the vehicle.

In the vehicular fastening structure described above, the overall length (L) of the through hole (33) is set at 1.5 to 2.0 times a diameter of the fastening member (26), and the diameter (D) of the through hole (33) is set at 1.2 to 1.5 times the shaft diameter of the fastening member (26).

With this constitution, it is possible, with a simple and compact constitution, to cause the lower portion of the fastening member to contact the lower end portion of the guiding portion so as to be supported thereby appropriately during a head-on collision or the like in the vehicle.

In the vehicular fastening structure described above, the fastening member (26) is screwed into the fastened member (27) by screwing a self-tapping screw portion (31) formed on a tip end portion of the fastening member (26) into the fixed attachment portion (30) of the fastened member (27).

With this constitution, a screw groove can be formed in the peripheral surface of the fixed attachment portion simultaneously with the fastening operation of the fastening member, and the fixed attachment operation of the fastening member can be performed easily. As a result, the cabin and chassis frame of the vehicle can be fastened appropriately by the fastening member.

This application is based on Japanese Patent Application Serial No. 2010-231389 filed in Japan Patent Office on Oct. 14, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A vehicular fastening structure for fastening a cabin and a chassis frame of a vehicle, comprising:
    a mounting bracket provided on the chassis frame;
    a fastened member provided at an inner side of a lower plate having a hat-shaped cross section, the lower plate being provided above the mounting bracket and joined to a lower surface of the cabin;
    a fastening member provided on the mounting bracket side and fastened to the fastened member from below; and
    a shock absorbing member disposed between the mounting bracket and the fastened member,
    wherein the fastened member is provided with a fixed attachment portion to which the fastening member is fixedly attached and a guiding portion provided below the fixed attachment portion and having a function of guiding the fastening member to the fixed attachment portion,
    the guiding portion includes a through hole having a larger diameter than a shaft diameter of the fastening member and a guide portion provided on an upper end portion of the through hole so as to taper toward an upper end, and
    a support portion for supporting the fastening member by coming into contact with the fastening member when the vehicle is in collision such that the fastening member deforms in accordance with an impact load input into the chassis frame is provided on a lower end portion of the through hole of the guiding portion.

2. The vehicular fastening structure according to claim 1, wherein an overall length of the through hole is set at a larger value than a diameter thereof.

3. The vehicular fastening structure according to claim 2, wherein the overall length of the through hole is set at 1.5 to 2.0 times a diameter of the fastening member, and the diameter of the through hole is set at 1.2 to 1.5 times the shaft diameter of the fastening member.

4. The vehicular fastening structure according to claim 3, wherein the fastening member is screwed into the fastened member by screwing a self-tapping screw portion formed on a tip end portion of the fastening member into the fixed attachment portion of the fastened member.

* * * * *